(12) United States Patent
Kuznecov et al.

(10) Patent No.: US 7,625,658 B2
(45) Date of Patent: Dec. 1, 2009

(54) INTERCONNECTOR FOR HIGH-TEMPERATURE FUEL CELL UNIT

(75) Inventors: Mihail Kuznecov, Dresden (DE); Klaus Eichler, Dresden (DE); Peter Otschik, Possendorf (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 160 days.

(21) Appl. No.: 10/571,091

(22) PCT Filed: Aug. 24, 2004

(86) PCT No.: PCT/DE2004/001932

§ 371 (c)(1),
(2), (4) Date: Dec. 12, 2006

(87) PCT Pub. No.: WO2005/027247

PCT Pub. Date: Mar. 24, 2005

(65) Prior Publication Data

US 2007/0116998 A1    May 24, 2007

(30) Foreign Application Priority Data

Sep. 8, 2003   (DE) ................. 103 42 690
Oct. 22, 2003  (DE) ................. 103 50 478

(51) Int. Cl.
H01M 8/10    (2006.01)
H01M 8/12    (2006.01)
H01M 2/00    (2006.01)
H01M 4/00    (2006.01)

(52) U.S. Cl. .............. 429/38; 429/30; 429/34; 429/35

(58) Field of Classification Search .............. 429/30, 429/31, 32, 33
See application file for complete search history.

(56) References Cited

U.S. PATENT DOCUMENTS

| 5,190,834 | A | * | 3/1993 | Kendall | 429/31 |
| 5,725,965 | A | * | 3/1998 | Wachsman et al. | 429/33 |
| 5,942,348 | A | * | 8/1999 | Jansing et al. | 429/32 |
| 6,344,290 | B1 | * | 2/2002 | Bossel | 429/38 |
| 6,670,068 | B1 | * | 12/2003 | Diez | 429/35 |
| 6,709,781 | B2 | * | 3/2004 | Suzuki et al. | 429/34 |
| 7,432,008 | B2 | * | 10/2008 | Joos et al. | 429/35 |
| 2002/0048700 | A1 | * | 4/2002 | Virkar et al. | 429/34 |
| 2002/0177026 | A1 | * | 11/2002 | Hatano et al. | 429/32 |
| 2003/0224238 | A1 | * | 12/2003 | Finn et al. | 429/35 |

FOREIGN PATENT DOCUMENTS

DE    4343914    6/1994

(Continued)

Primary Examiner—Dah-Wei D Yuan
Assistant Examiner—Katherine Turner
(74) Attorney, Agent, or Firm—Jacobson Holman PLLC

(57) ABSTRACT

A planar fuel cell unit on which a cathode-electrolyte-anode unit (CEA unit), a gas distributor element, inner contacting elements, sealing elements, and an interconnector. The interconnector is formed by a CEA mounting element, a base plate, and a gas distributor element. The CEA mounting element and the base plate are embodied as sheet metal parts that form two shells of a housing and enclose the gas distributor element in a gas-tight manner. Webs that are made of an electrically conductive material are applied to/configured on an external surface of the base plate.

19 Claims, 4 Drawing Sheets

FOREIGN PATENT DOCUMENTS

Figure 1:
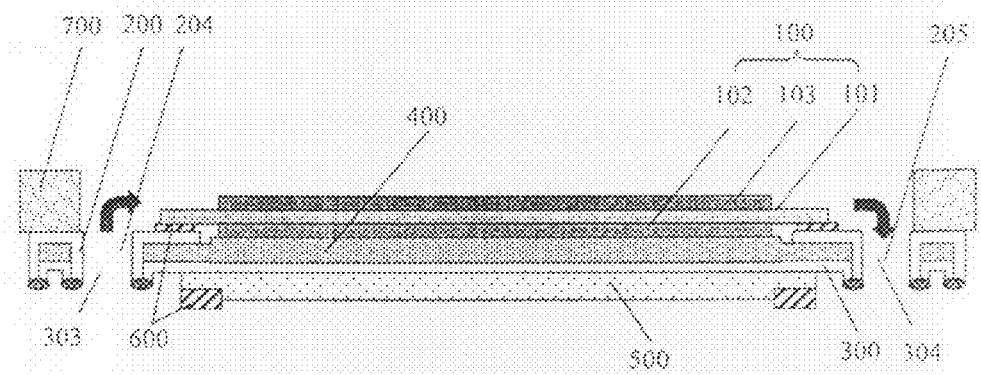

| | | |
|---|---|---|
| DE | 10044703 | 4/2002 |
| DE | 10135336 | 11/2002 |
| DE | 10135333 | 2/2003 |
| EP | 0722193 | 7/1996 |
| EP | 0897897 | 2/1999 |
| EP | 0907215 | 4/1999 |
| EP | 1078408 | 2/2001 |

* cited by examiner

INTERCONNECTOR FOR HIGH-TEMPERATURE FUEL CELL UNIT

This is a nationalization of PCT/DE2004/001932 filed 24 Aug. 2004 and published in German.

The present invention relates to a planar fuel cell unit on which a cathode-electrolyte-anode unit (subsequently termed CEA unit), a gas distributor element, elements for the internal contact, sealing elements and an interconnector are present.

APPLICATION FIELD

The invention is applied in energy conversion/storage by means of electrochemical generators, in particular by means of solid electrolyte fuel cells and electrolytic cells for operating temperatures from 500 to 1,000° C.

STATE OF THE ART

Planar fuel cell units are known from the state of the art. As a rule, a plurality of such fuel cell units is combined to form a stack in which the fuel cell units follow each other along a stacking direction.

During operation of the fuel cell unit, electrochemical reactions take place in the electrodes of the CEA unit, as a result of which electrons are released in the anode. The interconnector plates which are disposed between successive CEA units serve for electron transfer from the anode of the one fuel cell unit to the cathode of the adjacent fuel cell unit. The electron flow for an external current circuit is tapped by the plates positioned at the edge (cover plate and base plate).

These known fuel cell units comprise a CEA unit, the interconnector plate, seals and contacting elements. The interconnector plates which are used in the known fuel cell units are metallic parts eroded or milled from full plates between which the CEA units are situated so that the interconnector plates serve also as carriers of the CEA units and for mechanical stabilisation of the stack. Furthermore, these plates are provided with channels which serve for conducting the operating materials (combustible gas and oxidant) for the CEA unit. Such stacks are cost-intensive because of their complex interconnector production.

In DE 100 44 703, it was proposed to form the interconnector plate as a two-part shell comprising a contact plate and a fluid guidance element which surrounds the cathode-electrolyte-anode unit. The contact plate and the fluid guidance element are thereby produced from sheet metal material. The contact plate is intended to be in electrically conductive contact with the anode and the cathode of an adjacent fuel cell unit. For this purpose, it is intended to be provided with contact elements in the form of abutting projections and depressions or with an undulating structure in a contact field, produced by embossing. In order to achieve a gas-tight and simple connection between the housing parts, it was provided to connect these by specific shaping and by means of laser welding or electron beam welding (DE 101 35 336).

The production of the contact elements of such a contact plate involves a considerable rejection of sheet metal, which causes considerable difficulties during the further production of the fuel cell unit. Furthermore, the electrical contact resistance between the contact plate and the cathode of the CEA unit of the adjacent fuel cell units is too high and increases further during operation as a result of corrosion. Furthermore, the mechanical stability of such an interconnector which comprises two thin housing sheet metal parts is low so that it can be deformed at the operating temperature because of the occurring stresses and hence the mechanical strength was reduced and the electrical transition resistance was increased in quantity.

The object therefore underlying the present invention is to provide fuel cell units which comprise a CEA unit, gas distribution element, elements for internal contact and an interconnector, which
- does not require formation of contact elements directly on a sheet metal shaped part,
- ensures a low contact resistance between interconnector and CEA unit,
- avoids a short circuit between adjacent interconnectors,
- allows good sealing of the gas chambers from each other,
- allows sealing of the oxidant chamber externally and
- requires low production complexity.

ESSENCE OF THE INVENTION

This object is achieved with the features of claim 1. Advantageous embodiments and developments of the inventions can be achieved with the features described in the subordinate claims.

The fuel cell unit has a CEA mounting element which is configured as a sheet metal shaped part without additional contact elements. The CEA mounting element is connected to the base plate in a gas-tight manner, which base plate is configured as a sheet metal shaped part likewise without contact elements, a porous gas distributor element being disposed between the CEA mounting element and the base plate for mechanical stabilisation.

The sheet metal shaped parts can be produced by one or more shaping processes, in particular by embossing and/or deep-drawing, from a flat sheet metal blank.

The porous gas distributor element can be produced as a shaped wire mesh, in particular by stamping and cold-forming. As an alternative hereto, a cermet substrate or a porous metal powder composite can be used. A metal powder composite can be produced by conventional powder metallurgical methods (shaping at room temperature with subsequent firing).

Channels, which lead to a reduction in flow resistance during passage of the gases, can also be configured as gas distributor element. They can likewise be configured by shaping, for example by pressing. Such channels should have a depth between 0.2 and 3 mm, preferably between 0.5 to 0.8 mm. The total thickness of a gas distributor element can thereby be in the range between 0.5 and 5 mm.

The CEA mounting element and the base plate form shells of a housing for the porous gas distributor element which also has an electrical contact to the anode of the CEA unit. An additional contact layer can also be applied on the gas distributor element in order to reduce the electrical contact resistance to the anode. Advantageously, the gas distributor element can be mounted on the base plate or the CEA mounting element, in particular by means of spot welding or laser welding, electron welding or soldering. The gas distributor element serves at the same time as spacer between the CEA mounting element and the base plate.

For a preferred embodiment of the invention, it is provided that the CEA mounting element and the base plate has at least one opening for the gas supply into the gas distributor element and an opening for the gas discharge from the gas distributor element. The operating material supplied into the gas distributor element and discharged therefrom can be an oxidant or preferably a combustible gas.

In order to produce a reliable and gas-tight connection between the CEA mounting element and the base plate, it is provided that these parts are connected to each other by welding, preferably by laser welding. In addition hereto, it can be provided that the two parts are connected to each other by soldering or gas-tight adhesion, preferably with a solder glass. It can be provided furthermore that the CEA mounting element and the base plate can be inserted one in the other through a bead and thereafter can be connected integrally by welding, adhesion or soldering in a gas-tight manner.

In order to avoid complex structuring of the base plate, it is provided according to the invention to apply webs comprising an electrically conductive material on the outside of the base plate or to form them there. Preferably, the webs have a thickness of up to 1.5 mm. The webs serve for uniform gas distribution over the CEA electrode surface and for contacting the base plate to a CEA electrode, preferably the cathode.

The gas-tight connection of the CEA unit to the CEA mounting element can be produced by a seal which is applied preferably on the edge of the CEA unit. In addition hereto, it can be provided that the seal between the CEA unit and the CEA mounting element is formed as a coating on the CEA mounting element and/or on the CEA unit. Such a coating can be applied for example in the screen printing process, dispenser process, by roller coating or wet powder spraying. For the seal, in particular inorganic and ceramic materials are possible, which are chemically resistant at an operating temperature of up to 950° C., can be fired in a gas-tight manner and are electrically insulating. Preferably, a sealing material, the thermal expansion coefficient of which is compatible with that of the CEA unit, should be chosen. For example a solder glass with crystallising glass can be used as sealing medium, said glass having an expansion coefficient close to that of the electrolyte of the CEA unit after crystallisation. Such solder glass is known from EP 0 897 897 A1.

The stack comprises a plurality of fuel cell units according to the invention which follow each other in series along a stacking direction. In order to achieve a reliable, gas-tight and electrically insulating connection between the successive gas openings of the fuel cell units, the same sealing materials as those which are described for achieving the seal between the CEA unit and the CEA mounting element are possible.

In a preferred embodiment, a slightly deformable electrically insulating material, in particular $Al_2O_3$ nonwoven fabric, should be used for the seal of the chamber between the fuel cell units externally.

In order to be able to supply and discharge an operating material (combustible gas or oxidant) in a simple manner, it is provided advantageously that at least one of the plates positioned at the edge (cover plate and base plate) has at least one gas through-opening. Furthermore the cover plate and the base plate have an interface for the system connection of the stack.

A method which comprises the following method steps is suitable for producing a stack which comprises a plurality of fuel cell units according to the invention:

assembly of the interconnector comprising CEA mounting element, gas distributor element and base plate;
gas-tight connection of CEA mounting element and base plate;
formation of the webs on the base plate;
assembly of the sealing elements on CEA mounting element and/or base plate;
disposition of the CEA unit;
subsequent assembly of the stack by arrangement of fuel cell units along a stack direction and fixing the fuel cell units in their position relative to each other;
clamping of the fuel cell stack, preferably by means of a weight load and also
compression of the sealing elements and subsequent permeability test.

Figure 2:
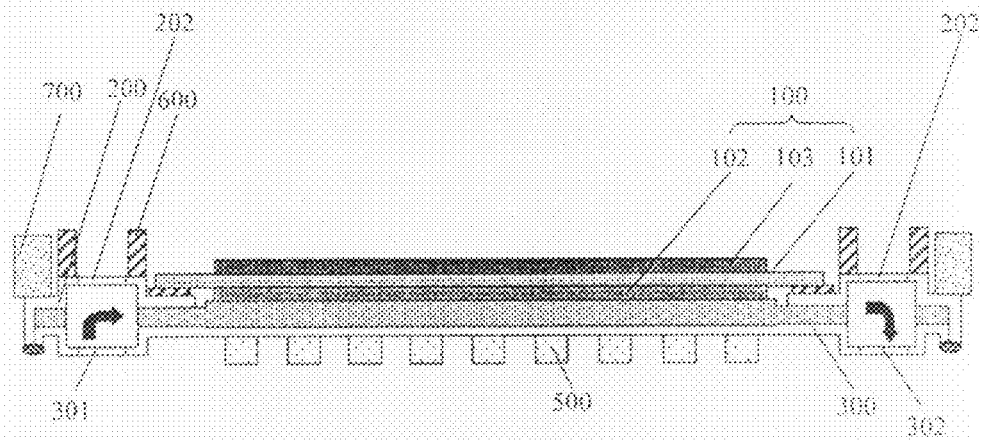
Figure 3:
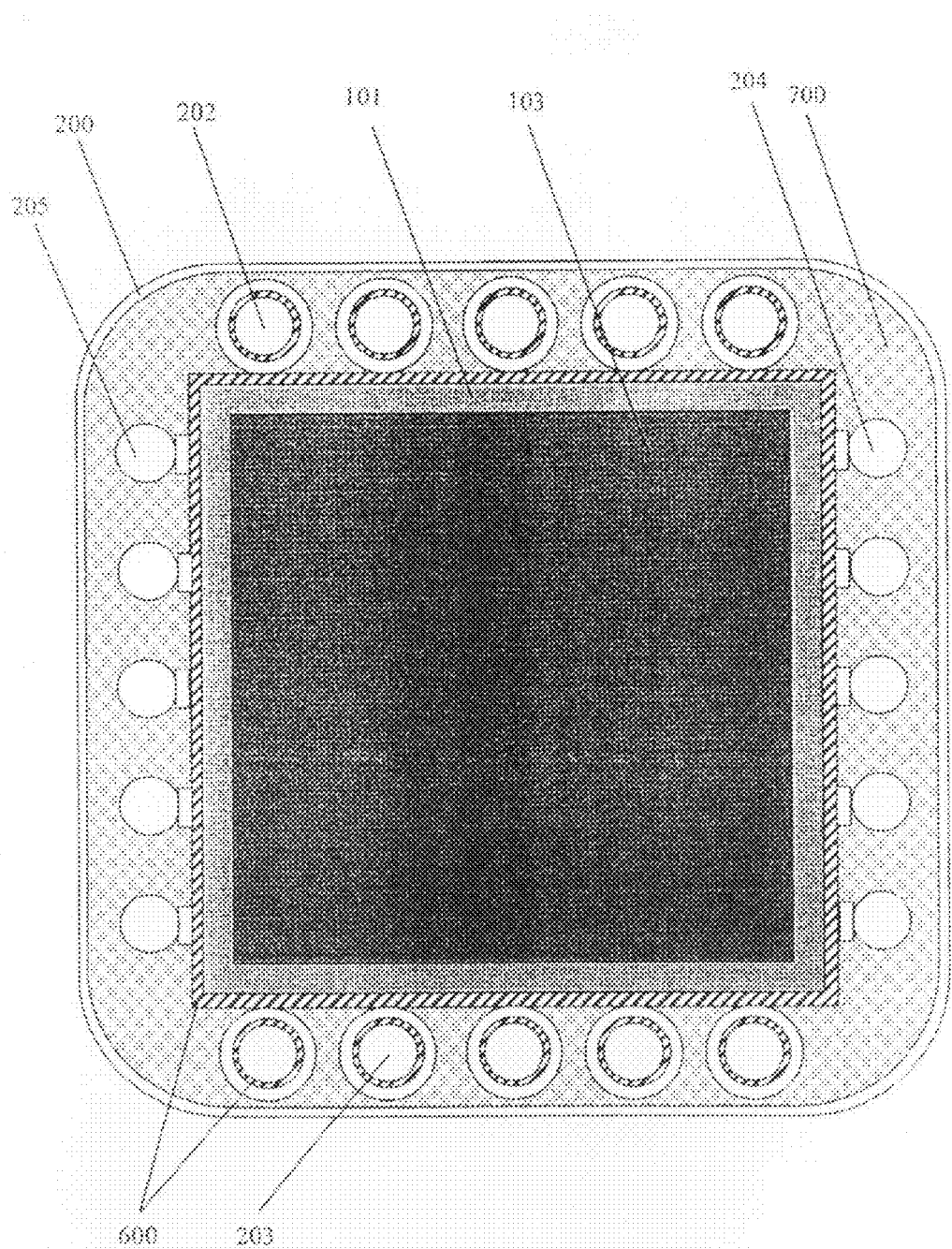
Figure 4:
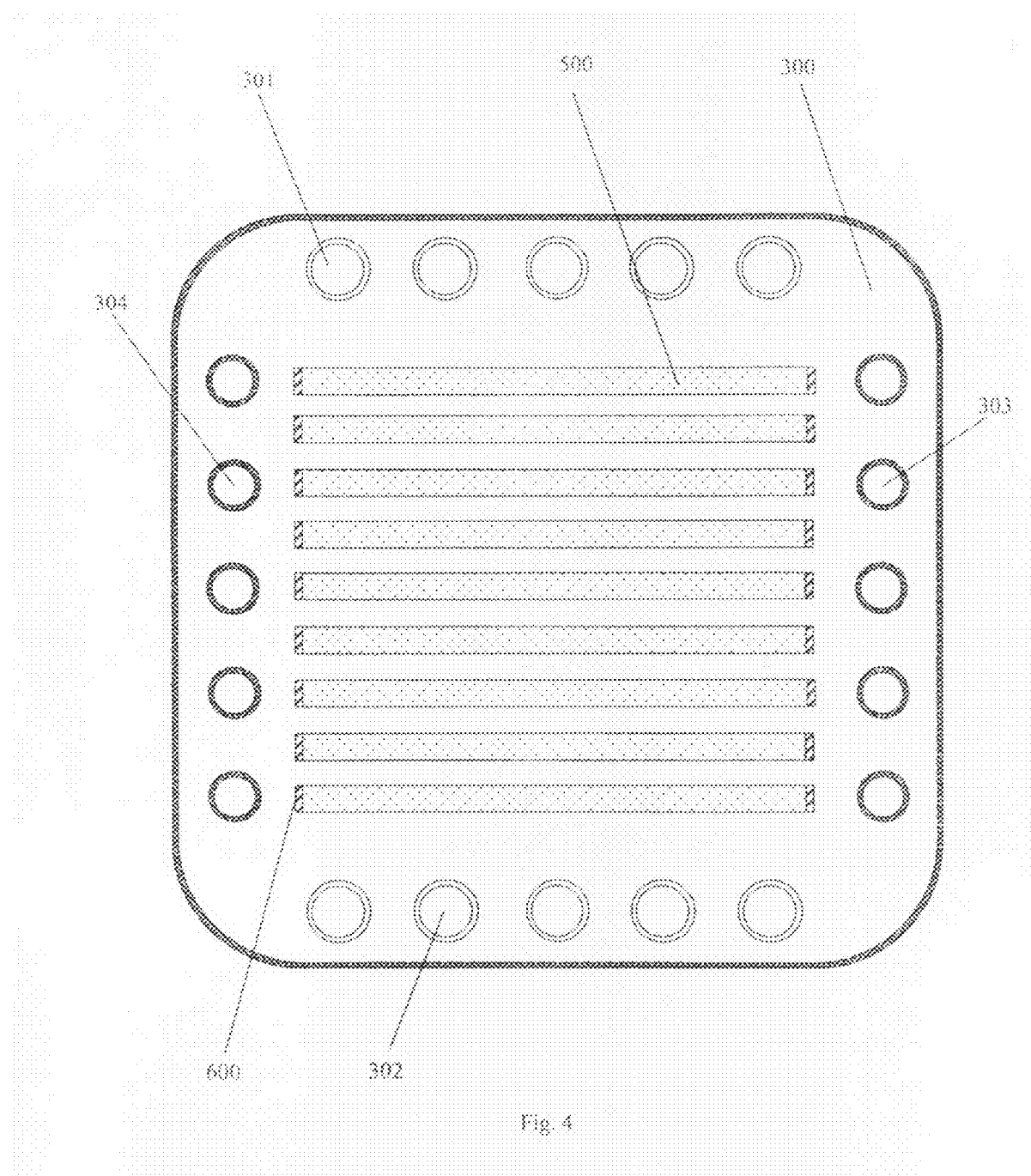

There are thereby shown:

FIG. 1 a schematic longitudinal representation through an example of a fuel cell unit according to the invention;

FIG. 2 in schematic form, a cross-sectional representation of FIG. 1;

FIG. 3 an anode-side plan view on a CEA mounting element;

FIG. 4 a plan view on a base plate, and

Figure 5:
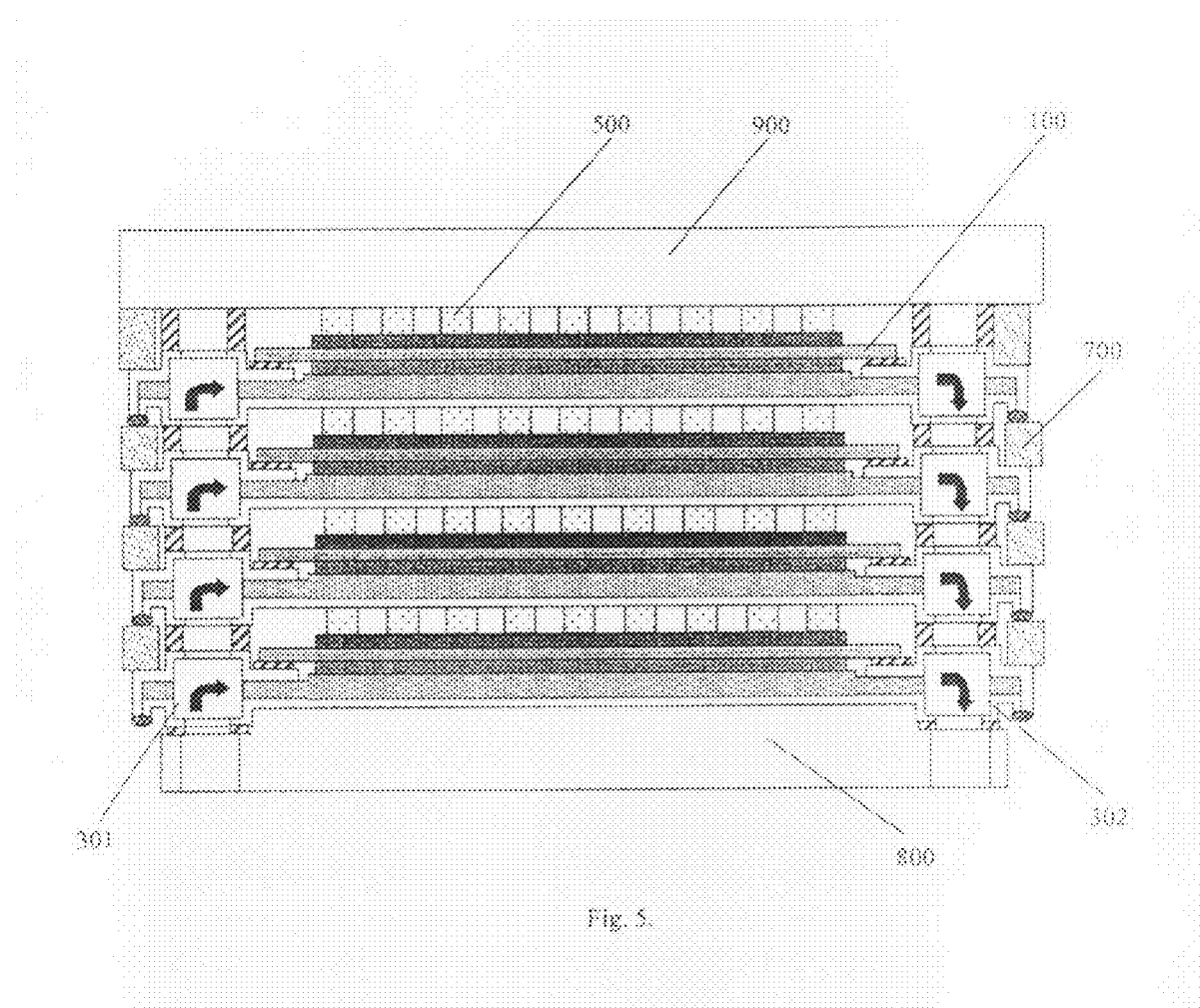

FIG. 5 a schematic sectional representation of a stack of fuel cell units.

In FIG. 1 there is shown a schematic longitudinal section and in FIG. 2 a schematic cross-section of a fuel cell unit having a CEA unit (100), comprising an electrolyte (101), an anode (102) and a cathode (103), a CEA mounting element (200), comprising a shaped metal sheet with through-opening for the anode (102) and openings for a combustible gas supply (202) and combustible gas discharge (203) and also openings for air supply (204) and air discharge (205), a base plate (300), comprising a shaped metal sheet with openings for combustible gas supply (301) and combustible gas discharge (302) and also openings for air supply (303) and air discharge (304), a gas distributor element (400), comprising a pre-compressed wire mesh or metal sheet and webs (500) on a base plate surface, comprising an electrically conductive material.

The plan view on a CEA mounting element 200 and on a base plate 300 is represented schematically in FIGS. 3 and 4.

On the CEA unit 100 there is a gas-tight electrolyte 101, preferably an oxygen ion conductor, for example comprising zirconium oxide stabilised by yttrium. There is situated on the electrolyte 101 a plate-shaped cathode 103 which is formed from an electrically conductive and electrocatalytically active material, for example from $(La, Sr)MnO_3$, and has an open porosity in order to enable passage to the electrolyte 101 for an oxidant, for example air, from the oxidant chamber abutting on the cathode 103. On the CEA unit 100 there is a plate-shaped anode 102 comprising an electrically conductive and electrocatalytically active material, such as for example $Ni-ZrO_2$ cermet which is porous in order to enable passage through the anode 102 to the electrolyte 101 for the combustible gas from the combustible gas chamber.

At the edge which is free of electrodes, the CEA unit is connected substantially in a gas-tight manner by means of sealing material 600, for example a solder glass, to the CEA mounting element 200 so that the oxidant from the cathode chamber cannot come into direct contact with the combustible gas from the combustible gas chamber.

During operation, the CEA unit 100 has a temperature of for example 850° C., at which the electrolyte 101 has a low internal resistance for oxygen ion transport. The combustible gas from the combustible gas chamber is oxidised by the oxygen ions from the electrolyte 101 and thereby discharges the electrons to the anode 102. The electrons are transferred via the gas distributor element 400 into the base plate 300 and supplied further by the webs 500 to the cathode 103 of the next fuel cell unit for formation of oxygen ions from the oxidant.

The CEA mounting element 200 and the base plate 300 form a two-part shell around the gas distributor element 400. They comprise a metal sheet shaped part with good electrical conductivity, preferably made of a stainless steel sheet with a thickness of up to 1 mm which is chemically resistant in air and in combustible gas at temperatures of up to 950° C., has a thermal expansion coefficient close to that of the CEA unit 100, in air, forms an oxide layer with good conductivity, as far as possible is weldable in air.

The CEA mounting element 200 and the base plate 300 can be inserted one in the other through a bead on the metal sheet edge and in the oxidant openings and as a result can enclose the gas distributor element 400 as a housing. The bead is sealed relative to the exterior for sealing, preferably welded by laser.

The gas distributor element 400 represents a porous wire mesh with openings for the combustible gas supply and discharge and made from a stainless steel wire, which element serves for uniform distribution of combustible gas over the anode 102 of the CEA unit 100 in the combustible gas chamber. It comprises a wire with good electrical conductivity, preferably a wire with a diameter of up to 0.5 mm which is chemically resistant in the combustible gas at the occurring temperatures of up to 950° C., has a thermal expansion coefficient close to that of the stainless steel sheet.

The wire mesh is preferably pre-compressed such that, in the middle, a non-deformed or less deformed zone remains, which serves for contacting of the wire mesh to the anode 102 of the CEA unit 100. Furthermore, this non-deformed zone contributes to the combustible gas throughflow being conducted essentially under the anode surface because of smaller flow losses. In the preferred embodiment, an additional contact layer can be applied on this zone by roller coating.

In order to achieve the contact of the anode of a fuel cell unit with the cathode 103 of the adjacent fuel cell unit according to the invention without structuring of a contact field of the base plate 300, the webs 500 are applied onto the base plate 300 by means of dispenser processes or mask printing or screen printing and dried. Alternatively hereto, a raw foil can be laminated onto the base plate 300 and subsequently structured. Furthermore, the webs serve for a uniform gas distribution over the cathode 103 of the CEA unit 100. Advantageously, the webs 500 can be formed from an electrically conductive ceramic, ceramics selected from the group of perovskites still being preferred.

The stack comprises a multiplicity (at least 2) of the described fuel cell units which follow one after the other along a stacking direction.

An example with four fuel cell units is shown in FIG. 5. It begins with a base plate 800 and ends with a cover plate 900 on which webs 500 likewise are present. In order to achieve a reliable, gas-tight and electrically insulating connection between the successive gas openings of the fuel cell units, sealing materials based on a solder glass are used. In a preferred embodiment of the stack, a sealing flange for placing or applying the seals around the gas openings in the CEA mounting element 200 and in the base plate 300 is achieved by embossing technology. Furthermore, the thickness of the seal is consequently reduced also, which is of advantage for a gas-tight connection. If the seal is formed from a solder glass, then it can be produced by applying a paste containing glass powder. Upon reaching the operating temperature of the fuel cell stack, the solder glass becomes soft and fills the pores in the initial material. The glass crystallises after a heat treatment. The thereby produced glass ceramic has a thermal expansion coefficient close to that of the CEA unit 100. In a preferred embodiment of the stack it is provided to use a slightly deformable, electrically insulating material 700, preferably Al$_2$O$_3$ nonwoven fabric for sealing the chamber between the fuel cell units externally.

The invention claimed is:

1. Fuel cell unit having a cathode-electrolyte-anode (CEA) unit (100), in which an interconnector comprising a CEA mounting element (200) upon which the CEA unit is mounted through a sealing material, a base plate (300) and a gas distributor element (400) for distribution of combustible gas is formed, the CEA mounting element (200) and the base plate (300) comprise electrically conductive sheet metal parts defining two shells of a housing, said two shells surround said gas distributor element (400) in a gas-tight manner, wherein said base plate has an outer surface, further comprising a plurality of webs (500) formed of electrically conductive ceramic material applied/formed to said outer surface of said base plate.

2. Fuel cell unit according to claim 1, characterised in that the webs (500) have a thickness of at most 1.5 mm.

3. Fuel cell unit according to claim 1, characterised in that the CEA mounting element (200) is configured as a sheet metal shaped part.

4. Fuel cell unit according to claim 1, characterised in that the base plate (300) is configured as a sheet metal shaped part.

5. Fuel cell unit according to claim 1, characterised in that base plate (300) and CEA mounting element (200) are connected to each other by means of a gas-tight adhesive bond.

6. Fuel cell unit according to claim 1, characterised in that the gas distributor element (400) is produced from a pre-compressed metal wire mesh.

7. Fuel cell unit according to claim 1, characterised in that the gas distributor element (400) is produced from a pre-compressed metal powder composite.

8. Fuel cell unit according to claim 6, characterised in that channels are formed on the gas distributor element (400).

9. Fuel cell unit according to claim 8, characterised in that the channels have a depth of 0.2 to 3 mm on the gas distributor element (400).

10. Fuel cell unit according to claim 1, characterised in that the CEA unit (100) is mounted and supported on the CEA mounting element (200) via an electrically insulating gas-tight seal (600).

11. Fuel cell unit according to claim 10, characterised in that the seal (600) comprises a solder glass.

12. Fuel cell unit according to claim 1, characterised in that the base plate (300) and the CEA mounting element (200) are provided with at least one opening for the operating material supply (202, 204, 301, 303) and at least one opening for the operating material discharge (203, 205, 302, 304).

13. Fuel cell unit according to claim 1, characterised in that an oxidation chamber of the fuel cell is separated from the environment by an electrically insulating seal which abuts on the base plate (300) of an adjacent fuel cell unit.

14. Fuel cell unit according to claim 1, characterised in that the fuel cell unit has a gas opening seal which abuts on the CEA mounting element (200) and on the base plate (300) and seals the gas openings externally in a gas-tight manner.

15. Fuel cell unit according to claim 14, characterised in that the gas opening seal is a crystallising solder glass.

16. Fuel cell unit according to claim 14, characterised in that the gas opening seal has at least two separate seal elements.

17. Fuel cell unit according to claim 1, characterised in that zones with different deformation are present on the gas distributor element (400).

18. Fuel cell unit according to claim 1, characterised in that the gas distributor element (400) is less or not deformed in the region of the anode (102).

19. Fuel cell unit according to claim 1, characterised in that a contact layer is applied on the gas distributor element (400) in the region of the anode (102).

* * * * *

UNITED STATES PATENT AND TRADEMARK OFFICE
CERTIFICATE OF CORRECTION

| | | |
|---|---|---|
| PATENT NO. | : 7,625,658 B2 | Page 1 of 1 |
| APPLICATION NO. | : 10/571091 | |
| DATED | : December 1, 2009 | |
| INVENTOR(S) | : Kuznecov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Twenty-first Day of December, 2010

David J. Kappos
*Director of the United States Patent and Trademark Office*